United States Patent
Kobayashi et al.

(10) Patent No.: US 10,727,455 B2
(45) Date of Patent: Jul. 28, 2020

(54) POWER STORAGE DEVICE

(71) Applicant: TOYOTA JIDOSHA KABUSHIKI KAISHA, Toyota-shi, Aichi-ken (JP)

(72) Inventors: Keiichiro Kobayashi, Nisshin (JP); Shingo Yamane, Chiryu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 169 days.

(21) Appl. No.: 16/117,224

(22) Filed: Aug. 30, 2018

(65) Prior Publication Data
US 2019/0081285 A1   Mar. 14, 2019

(30) Foreign Application Priority Data

Sep. 12, 2017   (JP) ................. 2017-174934

(51) Int. Cl.
| H01M 2/02 | (2006.01) |
| H01M 2/30 | (2006.01) |
| H01M 10/04 | (2006.01) |
| H01M 2/18 | (2006.01) |
| H01M 2/26 | (2006.01) |
| H01M 2/14 | (2006.01) |

(52) U.S. Cl.
CPC ......... *H01M 2/028* (2013.01); *H01M 2/0217* (2013.01); *H01M 2/14* (2013.01); *H01M 2/18* (2013.01); *H01M 2/263* (2013.01); *H01M 2/30* (2013.01); *H01M 10/0431* (2013.01); H01M 2002/0297 (2013.01)

(58) Field of Classification Search
CPC ..... H01M 10/0431; H01M 2002/0297; H01M 2/028; H01M 2/30
See application file for complete search history.

(56) References Cited

FOREIGN PATENT DOCUMENTS

JP   2010-198946 A   9/2010

*Primary Examiner* — Carlos Barcena
(74) *Attorney, Agent, or Firm* — Sughrue Mion, PLLC

(57) ABSTRACT

A power storage device includes an electrode assembly including a first electrode and a second electrode, a first collector terminal connected to the first electrode, a second collector terminal connected to the second electrode, an accommodation case which accommodates the electrode assembly, and an insulating film arranged between the accommodation case and the electrode assembly. The first collector terminal is higher in electrical conduction resistance than the second collector terminal. The insulating film is provided with a first cut at a position adjacent to the first collector terminal and a second cut at a position adjacent to the second collector terminal. The first cut is smaller in area than the second cut.

3 Claims, 6 Drawing Sheets

POWER STORAGE DEVICE

This nonprovisional application is based on Japanese Patent Application No. 2017-174934 filed with the Japan Patent Office on Sep. 12, 2017, the entire contents of which are hereby incorporated by reference.

BACKGROUND

Field

The present disclosure relates to a power storage device.

Description of the Background Art

Various power storage devices have conventionally been proposed. For example, a power storage device described in Japanese Patent Laying-Open No. 2010-198946 includes an electrode assembly, an accommodation case, a positive electrode collector terminal, a negative electrode collector terminal, and an insulating film enclosure.

The electrode assembly is formed by winding a positive electrode sheet, a negative electrode sheet, and a separator as being stacked, and is formed to have a flat profile.

The electrode assembly includes a first main side surface and a second main side surface, a first side surface and a second side surface, and an upper surface and a lower surface.

The insulating film enclosure is formed to surround the electrode assembly, and an opening which opens upward is provided in the insulating film enclosure. The insulating film enclosure includes a first main wall portion and a second main wall portion, a lower wall portion, a first sidewall portion and a second sidewall portion, and a third sidewall portion and a fourth sidewall portion.

The first main wall portion is arranged on the first main side surface. The second main wall portion is arranged on the second main side surface. The lower wall portion is arranged on the lower surface of the electrode assembly.

The first sidewall portion and the second sidewall portion are arranged on the first side surface of the electrode assembly, and the first sidewall portion and the second sidewall portion are arranged as being superimposed on each other.

The third sidewall portion and the fourth sidewall portion are arranged on the second side surface of the electrode assembly, and the third sidewall portion and the fourth sidewall portion are arranged as being superimposed on each other.

A first cut is provided in the first sidewall portion, and a second cut is provided in the third sidewall portion.

In manufacturing the insulating film enclosure formed as above, initially, an insulating rolled assembly obtained by winding an elongated insulating film like a roll is prepared. Cuts are provided in opposing sides of the elongated insulating film at a distance from each other.

In pulling out a prescribed length of the insulating film, a positioning pin is inserted in a cut and then the insulating film is pulled out. After the prescribed length of the insulating film is pulled out, the insulating film is cut. The cut insulating film is bent to form the insulating film enclosure.

SUMMARY

In a power storage device, a metal material for forming a positive electrode collector terminal and a metal material for forming a negative electrode collector terminal are different from each other. The positive electrode collector terminal and the negative electrode collector terminal may be different from each other in thickness or shape. Therefore, in general, the positive electrode collector terminal is different from the negative electrode collector terminal in electrical conduction resistance.

When overcharging occurs, gas at a high temperature may be generated in the electrode assembly. Such high-temperature gas originates from a portion at a high temperature where the collector terminal and the electrode assembly are connected to each other. Therefore, a point of generation of the high-temperature gas is likely to appear in a portion of connection between the electrode assembly and any one of the positive electrode collector terminal and the negative electrode collector terminal which is higher in electrical conduction resistance.

A portion of the insulating film enclosure where a cut is provided is low in heat resistance. Therefore, when high-temperature gas impinges on the portion of the insulating film enclosure where the cut is provided, the high-temperature gas may melt the insulating film enclosure in an early stage and the high-temperature gas may directly impinge on the accommodation case for a long period of time.

When the high-temperature gas impinges on the accommodation case for a long period of time, the accommodation case may melt, which may lead to perforation of the accommodation case.

The present disclosure was made in view of the problems as above, and an object of the present disclosure is to provide a power storage device including an insulating film between an accommodation case and an electrode assembly, the insulating film high in dimension accuracy being formed therein, the power storage device allowing reduction in time period of impingement of high-temperature gas on the accommodation case even on the occurrence of generation of the high-temperature gas in the electrode assembly.

A power storage device according to the present disclosure includes an electrode assembly including a first electrode and a second electrode, a first collector terminal connected to the first electrode, a second collector terminal connected to the second electrode, an accommodation case which accommodates the electrode assembly, and an insulating film arranged between the accommodation case and the electrode assembly. The first collector terminal is higher in electrical conduction resistance than the second collector terminal. The insulating film is provided with a first cut at a position adjacent to the first collector terminal and a second cut at a position adjacent to the second collector terminal. The first cut is smaller in area than the second cut.

According to the power storage device, a temperature of the first collector terminal tends to be high during charging and discharging. On the other hand, high-temperature gas may be generated in the electrode assembly when overcharging or internal short-circuiting occurs. A point of generation of the high-temperature gas is likely to appear in a portion at a high temperature, and a portion of connection between the first collector terminal and the electrode assembly and a portion located around the same tend to be the point of generation of the high-temperature gas. When generation of the high-temperature gas starts from the point of generation, a large amount of high-temperature gas tends to be generated from the point of generation.

The insulating film is provided with the first cut adjacent to the first collector terminal which tends to be the point of generation of the high-temperature gas, and an area of the first cut is small.

Therefore, the insulating film is arranged in a most part between the first collector terminal and the accommodation case. Even though a large amount of high-temperature gas is generated from the portion of connection between the first collector terminal and the electrode assembly and a portion around the same, direct impingement of the high-temperature gas on the accommodation case can be suppressed.

In manufacturing the insulating film, the first cut and the second cut can be made use of so that an insulating film high in dimension accuracy can be formed.

The electrode assembly is a winding assembly formed to surround an axial line of winding. The electrode assembly includes a first end surface located at one end in a direction of extension of the axial line of winding and having the first electrode formed and a second end surface located at the other end in the direction of extension of the axial line of winding and having the second electrode formed. The insulating film includes a first wall portion and a second wall portion arranged as being opposed to the first end surface and arranged as being superimposed on each other and a third wall portion and a fourth wall portion arranged as being opposed to the second end surface and arranged as being superimposed on each other. The first cut is provided in the first wall portion. The second cut is provided in the third wall portion.

According to the power storage device, the electrode assembly is formed of the winding assembly. Therefore, high-temperature gas generated in the electrode assembly tends to burst out of the first end surface and the second end surface.

The first wall portion and the second wall portion are arranged on the first end surface, so that a time period required for the high-temperature gas which bursts out of the first end surface to melt the insulating film can be longer. Consequently, a time period of direct impingement of the high-temperature gas on the accommodation case can be reduced and perforation of the accommodation case can be suppressed.

Similarly, since the third wall portion and the fourth wall portion are also arranged on a side of the second end surface, a time period of impingement of the high-temperature gas on the accommodation case can be reduced.

The first cut is provided at a position opposed to an end portion of the first collector terminal and the second cut is provided at a position opposed to an end portion of the second collector terminal.

According to the power storage device, during charging and discharging of a power storage device 1, a current flows through the first collector terminal and the second collector terminal. Since the first cut is provided at a position opposed to the end portion of the first collector terminal, the insulating film is arranged in a most part between the first collector terminal and the accommodation case. Consequently, insulation between the first collector terminal and the accommodation case can be ensured. The second cut is provided at a lower end portion of the second collector terminal, and the insulating film is arranged in a most part between the second collector terminal and the accommodation case. Insulation between the second collector terminal and the accommodation case is thus ensured.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
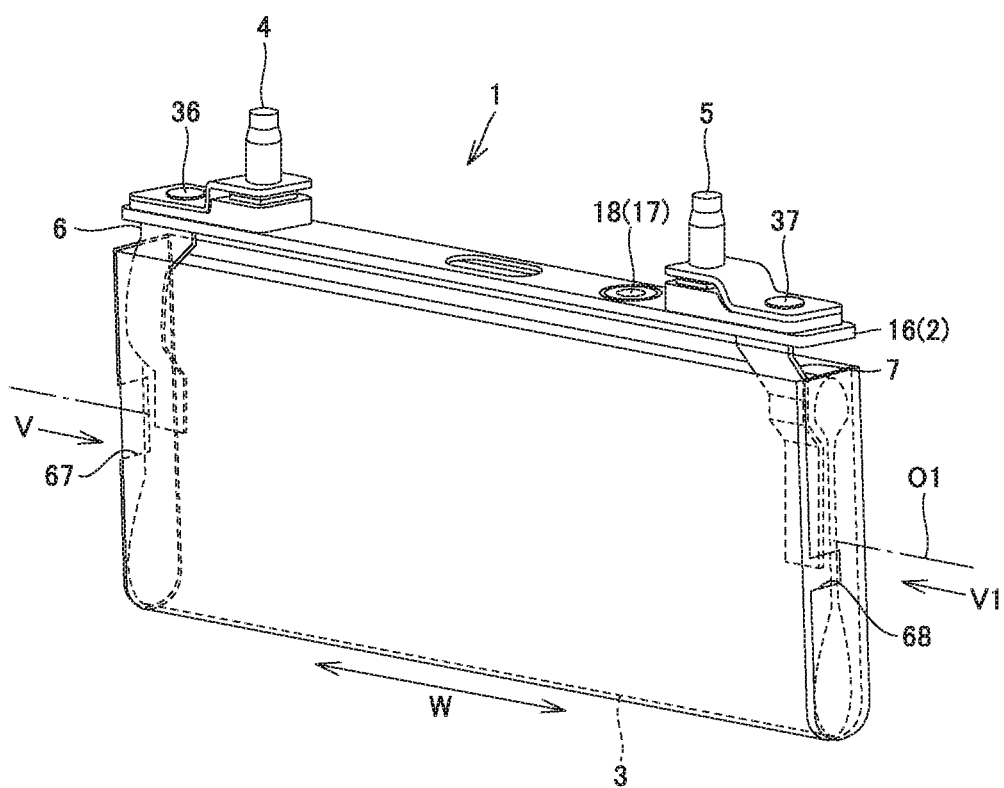
FIG. 1 is a perspective view showing a power storage device 1 as being partially exploded.
Figure 1:
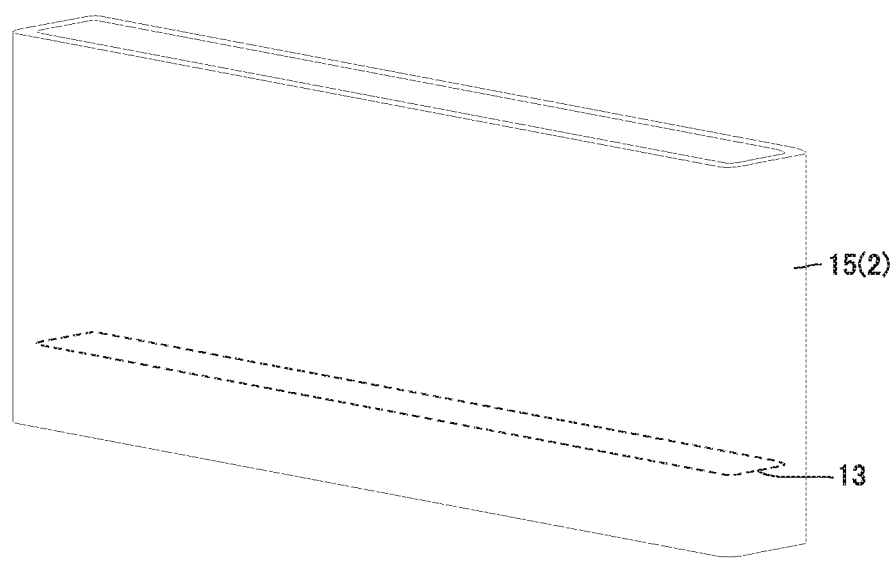

A power storage device according to the present embodiment will be described with reference to FIGS. 1 to 10. The same or substantially the same elements among elements shown in FIGS. 1 to 10 have the same reference characters allotted and redundant description may not be provided.

Figure 2:
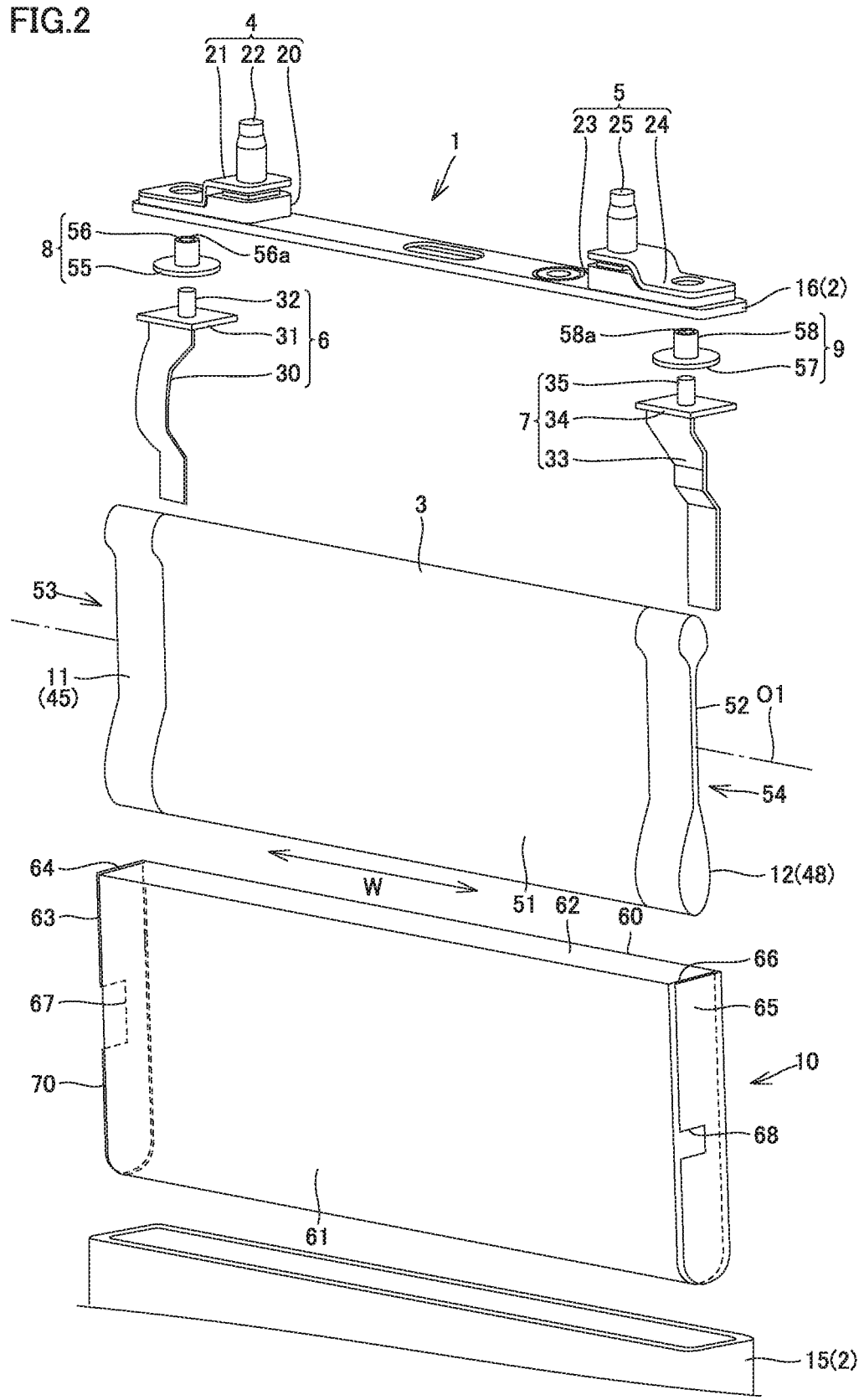
FIG. 2 is an exploded perspective view showing power storage device 1.

FIG. 1 is a perspective view showing a power storage device 1 as being partially exploded. FIG. 2 is an exploded perspective view showing power storage device 1. Power storage device 1 includes an accommodation case 2, an electrode assembly 3, a positive electrode external terminal 4, a negative electrode external terminal 5, a positive electrode collector terminal 6, a negative electrode collector terminal 7, insulating members 8 and 9, an insulating film 10, and an electrolyte 13.

Accommodation case 2 includes a case main body 15 and a lid 16. Case main body 15 and lid 16 are formed, for example, of aluminum or an aluminum alloy.

An opening which opens upward is provided in case main body 15. Lid 16 is arranged to close the opening in case main body 15, and an outer peripheral portion of lid 16 is welded to an opening edge portion of case main body 15.

A liquid introduction port 17 is provided in lid 16 and closed by a sealing member 18. Electrolyte 13 is an organic solvent and accommodated in accommodation case 2.

Positive electrode external terminal 4 and negative electrode external terminal 5 are provided on an upper surface of lid 16. Positive electrode external terminal 4 includes an insulating member 20, a metal plate 21, and a terminal bolt 22. Insulating member 20 is arranged on the upper surface of lid 16. Metal plate 21 is arranged on an upper surface of insulating member 20. Terminal bolt 22 is arranged on an upper surface side of insulating member 20 and inserted upward from below into a through hole provided in metal plate 21.

Negative electrode external terminal 5 is formed similarly to positive electrode external terminal 4. Negative electrode external terminal 5 includes an insulating member 23, a metal plate 24, and a terminal bolt 25.

Positive electrode collector terminal 6 and negative electrode collector terminal 7 are arranged on a lower surface side of lid 16. Positive electrode collector terminal 6 includes a leg portion 30, a base 31, and a protrusion 32. Positive electrode collector terminal 6 is formed, for example, of aluminum or an aluminum alloy.

Base 31 is formed like a plate, and protrusion 32 is formed on an upper surface of base 31 to protrude upward. Leg portion 30 is formed to extend downward from base 31. Leg portion 30 is welded to a positive electrode of electrode assembly 3.

Negative electrode collector terminal 7 includes a leg portion 33, a base 34, and a protrusion 35. Negative electrode collector terminal 7 is formed, for example, of copper or a copper alloy. Base 34 is formed like a plate. Protrusion 35 is formed to protrude upward from an upper surface of base 34. Leg portion 33 is formed to extend downward from base 34. Leg portion 33 is welded to a negative electrode of electrode assembly 3.

Negative electrode collector terminal (first collector terminal) 7 is higher in electrical conduction resistance than positive electrode collector terminal (second collector terminal) 6. Specifically, an electrical conduction resistance from an upper end portion of protrusion 35 of negative electrode collector terminal 7 to a lower end portion of leg portion 33 is higher than an electrical conduction resistance from an upper end portion of protrusion 32 of positive electrode collector terminal 6 to a lower end portion of leg portion 30. Therefore, during charging and discharging of power storage device 1, a temperature tends to be higher in negative electrode collector terminal 7 than in positive electrode collector terminal 6. An electrical conduction resistance of positive electrode collector terminal 6 or negative electrode collector terminal 7 is determined by a material, a shape, and a thickness of positive electrode collector terminal 6 and negative electrode collector terminal 7.

Electrode assembly 3 is formed by successively stacking a positive electrode sheet 40, a separator 41, a negative electrode sheet 42, and a separator 43 and winding this stack.

Figure 3:
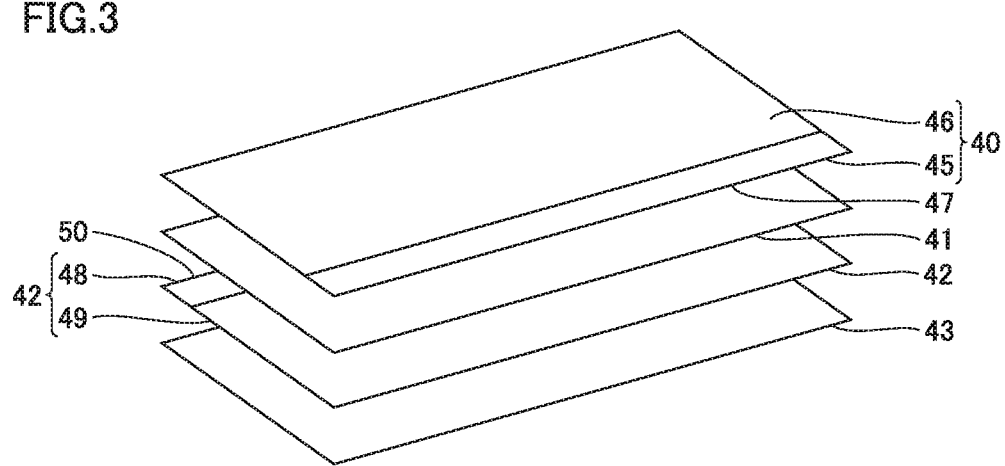
FIG. 3 is a perspective view showing a developed electrode assembly 3.

FIG. 3 is a perspective view showing developed electrode assembly 3. In the example shown in FIG. 3, negative electrode sheet 42 is arranged on an upper surface side of separator 43. Separator 41 is arranged on an upper surface side of negative electrode sheet 42. Positive electrode sheet 40 is arranged on an upper surface side of separator 41.

Positive electrode sheet 40 includes a metal foil 45 and a positive electrode composite material layer 46. Metal foil 45 is formed, for example, of aluminum or an aluminum alloy. Metal foil 45 is formed in an elongated rectangular shape and includes a pair of long side portions and a pair of short side portions. Positive electrode composite material layer 46 contains a positive electrode active material and a binder. Positive electrode composite material layer 46 is formed on front and rear surfaces of metal foil 45. An uncoated portion 47 where positive electrode composite material layer 46 is not formed is formed in metal foil 45. Uncoated portion 47 is formed to extend along one long side portion of metal foil 45.

Negative electrode sheet 42 includes a metal foil 48 and a negative electrode composite material layer 49. Metal foil 48 is formed, for example, of copper or a copper alloy. Metal foil 48 is formed in a rectangular shape and includes a pair of long side portions and a pair of short side portions. Negative electrode composite material layer 49 contains a negative electrode active material and a binder. Negative electrode composite material layer 49 is formed on front and rear surfaces of metal foil 48. An uncoated portion 50 where negative electrode composite material layer 49 is not formed is formed in metal foil 48. Uncoated portion 50 is formed to extend along one long side portion of metal foil 48.

Positive electrode sheet 40 and negative electrode sheet 42 are stacked such that uncoated portion 50 of negative electrode sheet 42 and uncoated portion 47 of positive electrode sheet 40 are located opposite to each other.

Figure 4:
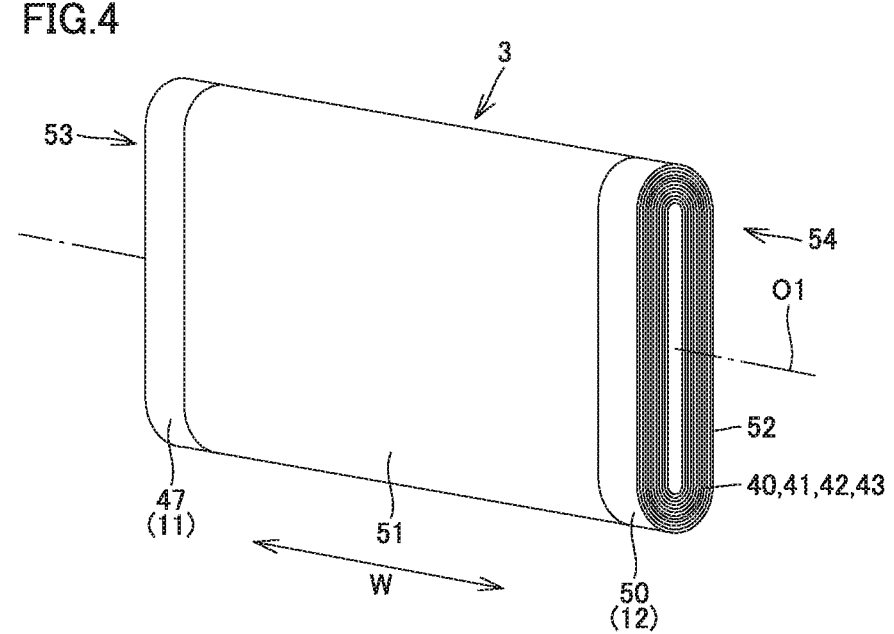
FIG. 4 is a perspective view showing a stack of a positive electrode sheet 40, a separator 41, a negative electrode sheet 42, and a separator 43 as being wound.

FIG. 4 is a perspective view showing a stack of positive electrode sheet 40, separator 41, negative electrode sheet 42, and separator 43 as being wound. The stack obtained by stacking positive electrode sheet 40, separator 41, negative electrode sheet 42, and separator 43 is wound around an axial line of winding O1.

Electrode assembly 3 is formed to have a flat profile. Electrode assembly 3 includes main side surfaces 51 and 52 and end surfaces 53 and 54. Main side surface 51 and main side surface 52 are aligned in a direction of thickness of electrode assembly 3. End surface 53 is located at one end in a direction of extension of axial line of winding O1 and end surface 54 is located at the other end in the direction of extension of axial line of winding O1.

Uncoated portion 47 of positive electrode sheet 40 is wound on a side of end surface 53 and uncoated portion 50 of negative electrode sheet 42 is wound on a side of end surface 54. Wound uncoated portion 47 forms a positive electrode 11 and wound uncoated portion 50 forms a negative electrode 12. Thus, in electrode assembly 3, positive electrode 11 is formed on end surface 53 and negative electrode 12 is formed on end surface 54.

In FIG. 2, leg portion 30 of positive electrode collector terminal 6 is welded to positive electrode 11 of electrode assembly 3 and leg portion 33 of negative electrode collector terminal 7 is welded to negative electrode 12 of electrode assembly 3. Insulating member 8 is arranged between positive electrode collector terminal 6 and lid 16. Insulating member 8 includes a base 55 and a cylindrical portion 56. Cylindrical portion 56 is formed on an upper surface of base 55 and a through hole 56a is provided in cylindrical portion 56. Through hole 56a is provided to reach a lower surface of base 55 from an upper end portion of cylindrical portion 56. Cylindrical portion 56 is inserted into a through hole provided in lid 16.

Protrusion 32 is inserted into through hole 56a and into a through hole provided in insulating member 20 and metal plate 21. The upper end portion of protrusion 32 is caulked to form a flange portion 36 as shown in FIG. 1.

Flange portion 36 couples positive electrode collector terminal 6 and metal plate 21 of positive electrode external terminal 4 to each other. Positive electrode external terminal 4 and positive electrode collector terminal 6 are thus electrically conductive to each other. Positive electrode external terminal 4 and positive electrode 11 of electrode assembly 3 are electrically connected to each other through positive electrode collector terminal 6.

Flange portion 36 is engaged with metal plate 21 so that insulating member 8 is in intimate contact with positive electrode collector terminal 6 and positive electrode external terminal 4. Insulating member 8 ensures insulation between lid 16 and positive electrode collector terminal 6.

Insulating member 9 is formed similarly to insulating member 8. Insulating member 9 includes a base 57 and a cylindrical portion 58. A through hole 58a is provided in cylindrical portion 58. Through hole 58a is provided to reach a lower surface of base 57 from an upper end portion of cylindrical portion 58.

Cylindrical portion 58 is inserted into a through hole provided in lid 16. Protrusion 35 of negative electrode collector terminal 7 is inserted into through hole 58a and into a through hole provided in insulating member 23 and metal plate 24. An upper end portion of protrusion 35 is caulked to form a flange portion 37.

Flange portion 37 couples negative electrode collector terminal 7 and metal plate 24 of negative electrode external terminal 5 to each other. Negative electrode external terminal 5, negative electrode collector terminal 7, and negative electrode 12 are electrically connected to one another.

Flange portion 37 is engaged with metal plate 24 so that insulating member 9 is in intimate contact with negative electrode collector terminal 7 and lid 16. Insulating member 9 ensures insulation between lid 16 and negative electrode collector terminal 7. Insulating members 8 and 9 are in intimate contact with lid 16 so that sealability of accommodation case 2 is ensured.

Insulating film 10 is formed like a bag, and an opening 60 which opens upward is provided in insulating film 10. Insulating film 10 is formed, for example, of a resin such as polyimide, aromatic polyamide, a phenol resin, polyethylene terephthalate, a fluorine resin, a polyolefin resin, or a polyamide resin. Insulating film 10 is attached to electrode assembly 3 from below and arranged between electrode assembly 3 and accommodation case 2.

Insulating film 10 includes a plurality of wall portions 61 to 66. Wall portion 61 is arranged on main side surface 51 of electrode assembly 3. Wall portion 62 is arranged on main side surface 52 of electrode assembly 3.

Wall portion 63 and wall portion 64 are arranged as being opposed to end surface 53 of electrode assembly 3 and arranged as being superimposed on each other. Wall portion 63 is arranged on an outer side of wall portion 64 and a cut 67 is provided in wall portion 63.

Wall portion 65 and wall portion 66 are arranged as being opposed to end surface 54 of electrode assembly 3 and as being superimposed on each other. Wall portion 65 is arranged on an outer side of wall portion 66. A cut 68 is provided in wall portion 65.

In FIG. 1, cut 67 is provided at a position adjacent to positive electrode collector terminal 6. Specifically, cut 67 is provided at a position adjacent to positive electrode collector terminal 6 in a direction of extension of axial line of winding O1. In the example shown in FIG. 1, the lower end portion of leg portion 30 of positive electrode collector terminal 6 and cut 67 are arranged as being superimposed in the direction of extension of axial line of winding O1.

Figure 5:
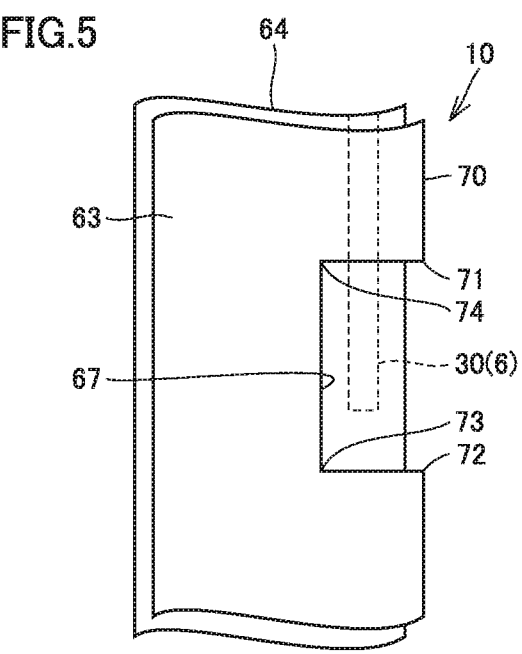
FIG. 5 is a plan view of a wall portion 63 and the like in a V direction shown in FIG. 1.

FIG. 5 is a plan view of wall portion 63 and the like in a V direction shown in FIG. 1. The V direction represents the direction of extension of axial line of winding O1. As shown in FIG. 5, when cut 67 and leg portion 30 are viewed in the direction of extension of axial line of winding O1, the lower end portion of leg portion 30 of positive electrode collector terminal 6 is located in cut 67. Wall portion 64 is arranged on an inner side of wall portion 63 and leg portion 30 is located on an inner side of insulating film 10.

In the example shown in FIG. 5, cut 67 is in a rectangular shape. Cut 67 is provided in a side 70 of wall portion 63. Cut 67 includes a plurality of vertices 71 to 74. An area of cut 67 refers to an area of a region surrounded by vertices 71 to 74. A shape of cut 67 can be various.

Figure 6:
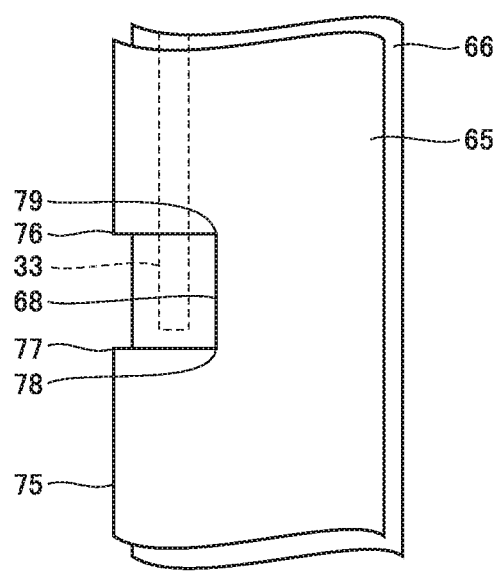
FIG. 6 is a plan view of a wall portion 65 and the like in a V1 direction shown in FIG. 1.

FIG. 6 is a plan view of wall portion 65 and the like in a V1 direction shown in FIG. 1. The V1 direction represents the direction of extension of axial line of winding O1. As shown in FIG. 6, when cut 68 is viewed in the direction of extension of axial line of winding O1, the lower end portion of leg portion 33 of negative electrode collector terminal 7 is located in cut 68. Wall portion 66 is located on an inner side of wall portion 65 and leg portion 33 is located on an inner side of insulating film 10.

In the example shown in FIG. 6, cut 68 is in a rectangular shape. Cut 68 is provided in a side 75 of wall portion 65.

Cut 68 includes a plurality of vertices 76 to 79. An area of cut 68 refers to an area of a region surrounded by vertices 76 to 79. A shape of cut 68 can be various. The area of cut 68 is smaller than the area of cut 67.

Figure 7:
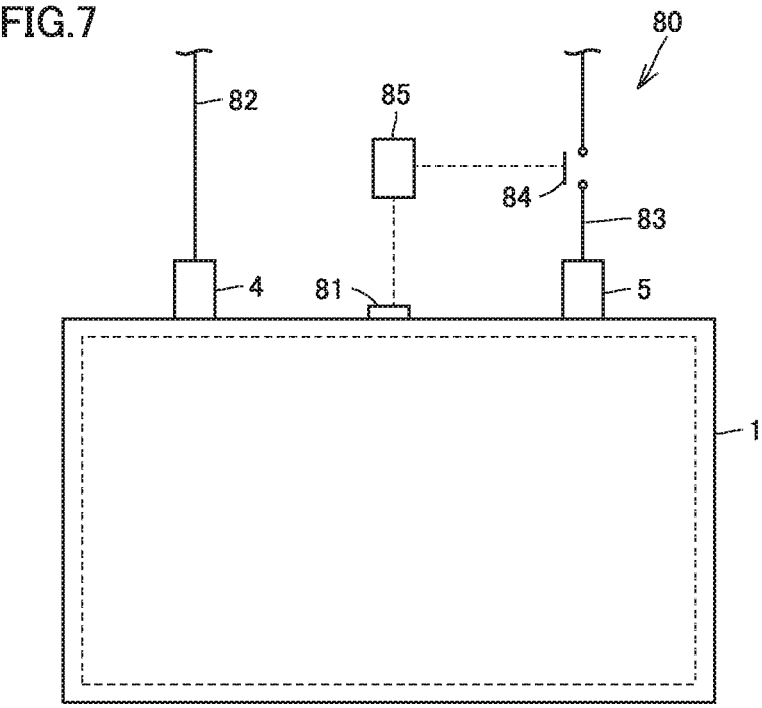
FIG. 7 is a schematic diagram schematically showing a current interrupter 80 provided in power storage device 1.

FIG. 7 is a schematic diagram schematically showing a current interrupter 80 provided in power storage device 1. Current interrupter 80 includes a temperature sensor 81, power lines 82 and 83, a relay 84, and a controller 85.

Temperature sensor 81 is provided on a surface of accommodation case 2 and measures a temperature of accommodation case 2. Power line 82 is connected to positive electrode external terminal 4 and power line 83 is connected to negative electrode external terminal 5. Relay 84 is provided in power line 83.

Controller 85 obtains temperature information of accommodation case 2 from temperature sensor 81. Controller 85 turns on relay 84 when the temperature measured by temperature sensor 81 is equal to or lower than a prescribed threshold value and turns off relay 84 when the temperature measured by temperature sensor 81 exceeds the prescribed threshold value.

For example, when relay 84 is turned off, flow of a current to power storage device 1 can be suppressed so that increase in temperature of power storage device 1 can be suppressed.

The current interrupter to be provided in power storage device 1 is not limited to the example shown in FIG. 7. For example, a CID may be adopted. A supply apparatus which supplies a fire extinguisher or a refrigerant to power storage device 1 may be applicable, without being limited to the current interrupter.

When overcharging or internal short-circuiting occurs in power storage device 1 constructed as above, heat generation reaction occurs in electrode assembly 3 and high-temperature gas may burst out of electrode assembly 3.

Since electrode assembly 3 is a winding assembly, high-temperature gas generated in electrode assembly 3 bursts out of end surfaces 53 and 54. A temperature of the high-temperature gas which bursts out of electrode assembly 3 may exceed a melting point of aluminum or the like.

A plurality of wall portions 63 and 64 are arranged on end surface 53 and a plurality of wall portions 65 and 66 are arranged also on end surface 54. Therefore, time required for the high-temperature gas which bursts out of end surface 53 to melt wall portions 63 and 64 can be longer. Similarly, time required for the high-temperature gas which bursts out of end surface 54 to melt wall portions 65 and 66 can be longer.

Thus, a total time period of impingement of high-temperature gas on accommodation case 2 until burst of the high-temperature gas calms down can be reduced. By reducing the time period of impingement of the high-temperature gas on accommodation case 2, melting of a part of accommodation case 2 and perforation of accommodation case 2 can be suppressed.

Since the time period of impingement of the high-temperature gas on accommodation case 2 can be reduced, increase in temperature of accommodation case 2 can be suppressed. Thus, melting of insulating members 20 and 23 or melting of insulating members 8 and 9 can be suppressed.

Negative electrode collector terminal 7 is higher in electrical conduction resistance than positive electrode collector terminal 6 and a temperature of negative electrode collector terminal 7 is more likely to increase than a temperature of positive electrode collector terminal 6.

High-temperature gas is generated starting from a portion in electrode assembly 3 where a temperature is high. In the present embodiment, a temperature of negative electrode collector terminal 7 tends to increase. Therefore, a portion where negative electrode collector terminal 7 and negative electrode 12 are welded to each other tends to be a point of generation of high-temperature gas.

Therefore, a large amount of high-temperature gas tends to burst out of end surface 54 where negative electrode collector terminal 7 is provided. Since the area of cut 68 provided in wall portion 65 arranged on a side of end surface 54 is smaller than the area of cut 67 in wall portion 63 provided on end surface 53, time required for melting wall portion 65 can be longer even though a large amount of high-temperature gas bursts out of end surface 54. Consequently, a time period of impingement of high-temperature gas which bursts out of end surface 54 on accommodation case 2 can be reduced.

As set forth above, a temperature of accommodation case 2 has become high at the time when high-temperature gas bursts out of electrode assembly 3, and hence current interrupter 80 is driven.

When current interrupter 80 is driven and relay 84 is turned off, flow of a current to power storage device 1 can be suppressed and heat generation reaction in electrode assembly 3 is suppressed. When a supply apparatus which supplies a fire extinguisher or a refrigerant is provided in power storage device 1, heat generation reaction of electrode assembly 3 can effectively be suppressed.

Current interrupter 80 or a supply apparatus is driven while wall portions 63, 64, 65, and 66 block high-temperature gas, so that generation of high-temperature gas can be suppressed before the high-temperature gas comes in direct contact with accommodation case 2.

If high-temperature gas impinges on accommodation case 2 and a side surface of accommodation case 2 is perforated, such a disadvantage as leakage of electrolyte 13 from accommodation case 2 to the outside will occur. In power storage device 1 according to the present embodiment, the disadvantage as above can be suppressed.

A function of power storage device 1 on the occurrence of an abnormal condition such as internal short-circuiting or overcharging therein has been described. A function of power storage device 1 during normal use such as rapid charging will now be described.

When power storage device 1 is rapidly charged or high power is discharged from power storage device 1 to the outside, a high current flows in power storage device 1.

When a high current flows in power storage device 1, a temperature of electrode assembly 3, positive electrode collector terminal 6, and negative electrode collector terminal 7 increases.

An area of main side surfaces 51 and 52 of electrode assembly 3 is greater than an area of end surfaces 53 and 54, and the number of wall portions of insulating film 10 which cover main side surfaces 51 and 52 is smaller than the number of wall portions of insulating film 10 which cover end surfaces 53 and 54.

Therefore, most of heat from electrode assembly 3 is radiated through wall portions 61 and 62 of insulating film 10 to accommodation case 2.

Heat from positive electrode collector terminal 6 is radiated through wall portions 63 and 64 to accommodation case 2. Since cut 67 large in area is provided in wall portion 63, heat from positive electrode collector terminal 6 is radiated through cut 67 to accommodation case 2.

Heat from negative electrode collector terminal 7 is radiated through wall portions 65 and 66 to accommodation case 2. In particular, cut 68 is provided in wall portion 65, and therefore heat from negative electrode collector terminal 7 is satisfactorily radiated through cut 68 to accommodation case 2.

When power storage device 1 is charged or power is discharged from power storage device 1 to the outside, a current passes through positive electrode 11, positive electrode collector terminal 6, and positive electrode external terminal 4 of electrode assembly 3. Cut 67 is provided on a side of the lower end portion of positive electrode collector terminal 6. Therefore, two wall portions 63 and 64 insulate a most part between positive electrode collector terminal 6 and an inner surface of accommodation case 2 and insulation between positive electrode collector terminal 6 and accommodation case 2 is ensured.

When power storage device 1 is charged or discharged, a current flows through negative electrode 12, negative electrode collector terminal 7, and negative electrode external terminal 5.

Cut 68 is provided on a side of the lower end portion of negative electrode collector terminal 7. Therefore, wall portions 65 and 66 insulate a most part between negative electrode collector terminal 7 and the inner surface of accommodation case 2 and insulation between negative electrode collector terminal 7 and accommodation case 2 is ensured.

Though an example in which insulating film 10 includes wall portion 63 and wall portion 64 has been described in the present embodiment, wall portion 64 is not an essential feature. For example, only wall portion 63 including cut 67 may be provided at a position adjacent to positive electrode collector terminal 6.

Similarly, wall portion 66 is not an essential feature. For example, only wall portion 65 including cut 68 may be arranged at a position adjacent to negative electrode collector terminal 7.

Though an example in which power storage device 1 including electrode assembly 3 of a winding assembly type is applied has been described in the present embodiment, a power storage device including a stack-type electrode assembly may be applicable.

Though an example in which negative electrode collector terminal 7 is higher in electrical conduction resistance than positive electrode collector terminal 6 has been described in the present embodiment, an example in which positive electrode collector terminal 6 is higher in conduction resistance than negative electrode collector terminal 7 may also be applicable. In this case, cut 67 is made smaller in area than cut 68.

Figure 8:
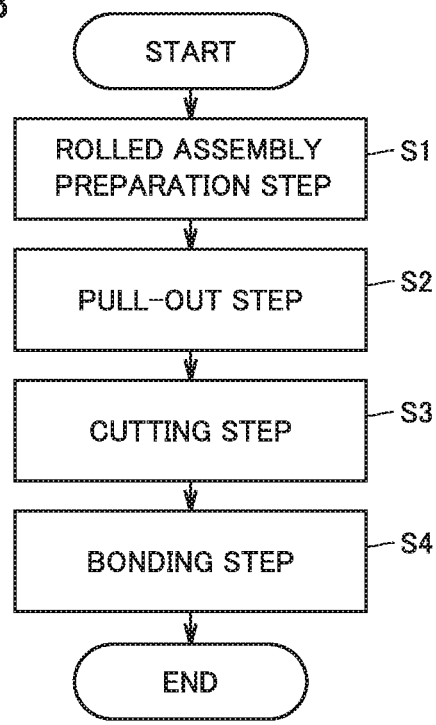
FIG. 8 is a flowchart showing a process of manufacturing an insulating film 10.

A method of manufacturing insulating film 10 will now be described. FIG. 8 is a flowchart showing a process of manufacturing insulating film 10. The process of manufacturing insulating film 10 includes a rolled assembly preparation step S1, a pull-out step S2, a cutting step S3, and a bonding step S4.

Figure 9:
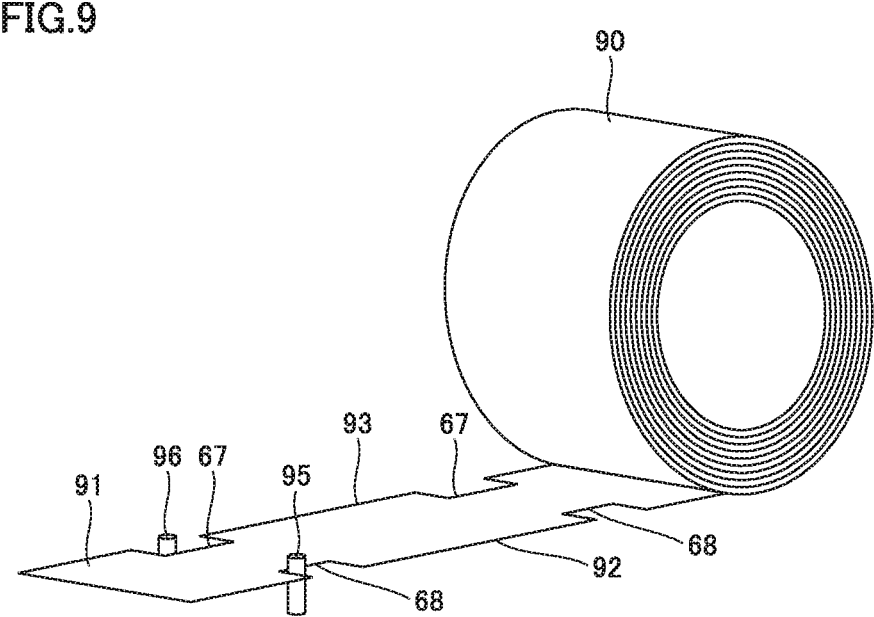
FIG. 9 is a perspective view schematically showing a rolled assembly preparation step S1 and a pull-out step S2.

FIG. 9 is a perspective view schematically showing rolled assembly preparation step S1 and pull-out step S2. In rolled assembly preparation step S1, an insulating rolled assembly 90 is prepared. Insulating rolled assembly 90 is formed by winding an elongated insulating sheet 91.

Pull-out step S2 is a step of pulling out insulating sheet 91 wound as insulating rolled assembly 90. Insulating sheet 91 includes a side 92 and a side 93 located on opposing ends in a direction of width.

A plurality of cuts 68 are provided at a distance from each other in side 92. A plurality of cuts 67 are provided at a distance from each other in side 93.

In pulling out insulating sheet 91 in pull-out step S2, a pin 95 is inserted in cut 68 and a pin 96 is inserted in cut 67.

By moving pins 95 and 96 in a direction of pull-out, insulating sheet 91 is pulled out. In cutting step S3, pulled-out insulating sheet 91 is cut at a prescribed length.

By thus inserting pins 95 and 96 in cuts and pulling out insulating sheet 91, accurate control of a length of pull-out of insulating sheet 91 is facilitated and insulating sheet 91 can accurately be cut at a prescribed position.

Figure 10:
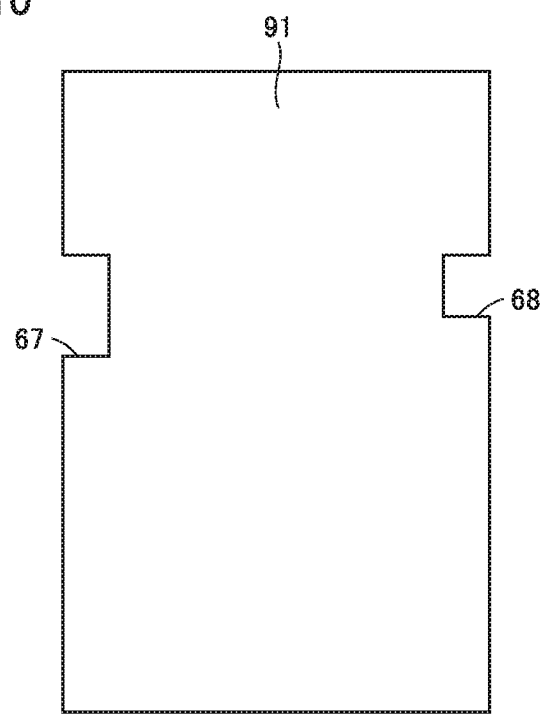
FIG. 10 is a plan view showing a cut insulating sheet 91.

FIG. 10 is a plan view showing cut insulating sheet 91. As shown in FIG. 9, cut 68 is provided in one side of cut insulating sheet 91 and cut 67 is provided in the other side.

Bonding step S4 includes a step of bending cut insulating sheet 91 to form insulating film 10, a step of bonding wall portion 63 and wall portion 64 to each other, and a step of bonding wall portion 65 and wall portion 66 to each other. Insulating film 10 can be formed through each step above.

By thus providing cuts 67 and 68 in insulating film 10, accuracy in manufacturing of insulating film 10 can be enhanced. Perforation of accommodation case 2 on the occurrence of an abnormal condition can be suppressed by changing an area of cuts 67 and 68.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power storage device comprising:
   an electrode assembly including a first electrode and a second electrode;
   a first collector terminal connected to the first electrode;
   a second collector terminal connected to the second electrode;
   an accommodation case which accommodates the electrode assembly; and
   an insulating film arranged between the accommodation case and the electrode assembly,
   the first collector terminal being higher in electrical conduction resistance than the second collector terminal,
   the insulating film being provided with a first cut at a position adjacent to the first collector terminal and a second cut at a position adjacent to the second collector terminal, and
   the first cut being smaller in area than the second cut.

2. The power storage device according to claim 1, wherein
   the electrode assembly is a winding assembly formed to surround an axial line of winding,
   the electrode assembly includes a first end surface located at one end in a direction of extension of the axial line of winding and having the first electrode formed and a second end surface located at the other end in the direction of extension of the axial line of winding and having the second electrode formed,
   the insulating film includes a first wall portion and a second wall portion arranged as being opposed to the first end surface and arranged as being superimposed on each other and a third wall portion and a fourth wall portion arranged as being opposed to the second end surface and arranged as being superimposed on each other,
   the first cut is provided in the first wall portion, and
   the second cut is provided in the third wall portion.

3. The power storage device according to claim 1, wherein
   the first cut is provided at a position opposed to an end portion of the first collector terminal, and
   the second cut is provided at a position opposed to an end portion of the second collector terminal.

\* \* \* \* \*